UNITED STATES PATENT OFFICE.

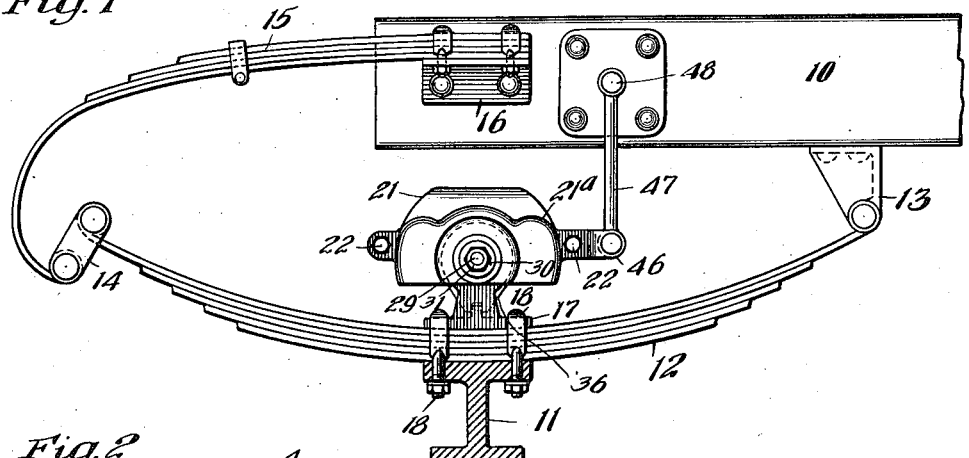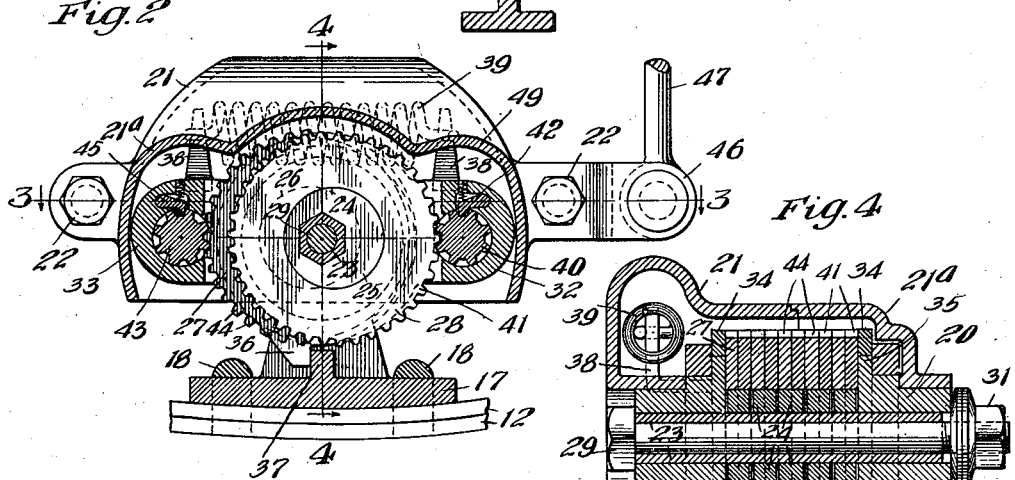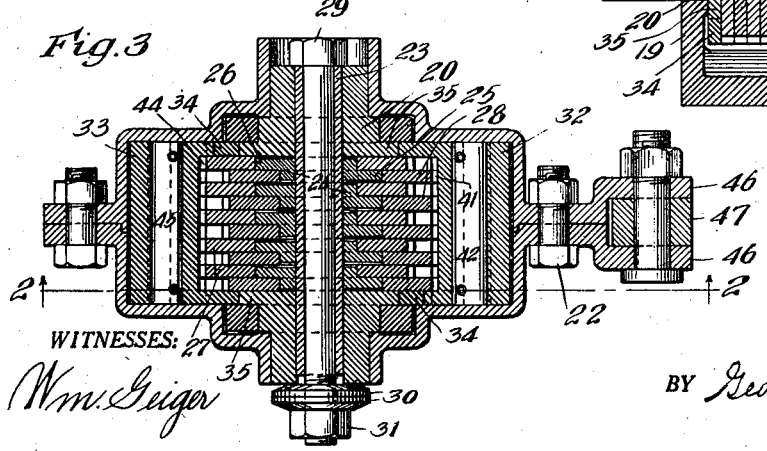

JOHN F. O'CONNOR, OF CHICAGO, ILLINOIS, ASSIGNOR TO WILLIAM H. MINER, OF CHAZY, NEW YORK.

SHOCK-ABSORBER.

1,303,949.  Specification of Letters Patent.  Patented May 20, 1919.

Application filed January 8, 1918.  Serial No. 210,882.

*To all whom it may concern:*

Be it known that I, JOHN F. O'CONNOR, a citizen of the United States, residing at Chicago, in the county of Cook and State of Illinois, have invented a certain new and useful Improvement in Shock-Absorbers, of which the following is a full, clear, concise, and exact description, reference being had to the accompanying drawings, forming a part of this specification.

This invention relates to improvements in shock absorbers.

The object of the invention is to provide a comparatively simple and relatively inexpensive shock absorber, more particularly designed for automobiles and other vehicles, and wherein are employed two sets of eccentrically disposed friction plates, so arranged as to present constantly shifting friction wearing surfaces each time the device is operated, to thereby prolong the life of the shock absorber.

In the drawing forming a part of this specification, Figure 1 is a part side elevation, part vertical section of portions of the body and running gear of an automobile showing my improvements in connection therewith. Fig. 2 is a vertical, sectional view, upon a somewhat larger scale, of the improved shock absorber. Fig. 3 is a sectional view, taken substantially on the line 3—3 of Fig. 2. And Fig. 4 is a vertical, sectional view, taken on the line 4—4 of Fig. 2.

In said drawing, 10 denotes the side frame of the automobile chassis, 11 one of the axles, 12 a half elliptic spring secured at its center to the axle 11 and at one end to a bracket 13 attached to the chassis, and at its other end connected by a link 14 to a quarter elliptic spring 15, the latter in turn being secured to a bracket 16 mounted on the chassis.

The improved shock absorber is shown in the drawing as adapted to cushion the excessive movements between the chassis 10 and axle 11. As shown, the shock absorber comprises a main or base casting 17, rigidly attached to the axle 11 by the spring-holding clips 18. The casting 17 is provided with upwardly extending spaced side walls 19—19, in which are seated bearing bushings 20—20 for oscillatably supporting a two-part housing or casing 21—21ª. The parts of the housing are applied laterally to the base casting 17 and are secured together by any suitable means such as the bolts 22—22.

Supported within the bearing bushings 20 is a hollow hexagonal sleeve 23 on which are mounted a plurality of plates 24. Each of said plates 24 is formed with a pair of eccentrically disposed bearings 25 and 26. The plates 24 are assembled in the manner most clearly indicated in Fig. 3, and mounted on the series of eccentric bearings 26 is a series of circular friction plates 27, and on the other series of eccentric bearings 25 is mounted a coöperating set of circular friction plates 28. The thickness of the friction plates 27 and 28 is made such that they will be brought into contact with each other and a slight space left between the plates 24. The friction plates 27 and 28 and the eccentric bearing plates 24 are held in assembled relation and under any desired frictional pressure by means of a bolt 29 which extends through the sleeve 23 and has mounted thereon a pair of spring washers 30—30 adapted to be adjustably compressed by the nut 31.

Disposed within the housing are two oppositely extending levers 32 and 33, each having an arm 34 suitably recessed to fit over a bearing flange 35 of the corresponding bearing members 20 so that the levers 32 and 33 are oscillatably supported. The levers 32 and 33 are each provided with a depending lug 36, the latter being adapted to engage a transversely arranged stop shoulder 37 at the bottom of the casting 17, one lug 36 engaging at one side and the other lug 36 at the opposite side. From the upper sides of the levers 32 and 33 are extended posts or lugs 38—38 disposed within the housing at one side thereof, as clearly shown in Fig. 4 and to which are connected the ends of a coiled spring 39, so that the latter will always normally return the levers 32 and 33 to the position indicated in Fig. 2.

Mounted within the lever 32 is a pinion pawl 40 adapted to coöperate with peripheral teeth 41 on the series of friction disks 28, the pinion pawl 40 being prevented against rotation in a clockwise direction by means of a spring controlled pawl 42. Mounted in the other lever arm 33 is a similar pinion pawl 43, which engages peripheral teeth 44 on the other series of friction disks 27. The pinion pawl 43 is prevented from rotation in a counter-clockwise direction by a spring controlled pawl 45.

The casing 21—21ᵃ is provided with forked extensions 46—46 to which is pivotally connected the lower end of a link 47, which in turn is pivotally connected at its upper end as indicated at 48, to the chassis. As clearly shown in Fig. 2, there is normally a space between the levers 32 and 33 and the adjacent portion of the housing, which space may be varied to suit different conditions of service for the purpose hereinafter described.

The operation is as follows: As the chassis and axle approach each other, it is apparent that the link 47 will oscillate the housing or casing in a clockwise direction and this movement will have no effect on the frictional elements of the shock absorbing device until the curved wall 49 of the casing comes into contact with the lever 32, and this relatively inactive movement may be varied as desired. Upon continued relative approach of the chassis and axle, the shoulder 49 of the casing will force the lever 32 downwardly and thus cause the friction plates 28 to rotate in a clockwise direction. In this manner, the friction created between the two sets of friction disks will absorb the excessive shock, as will be understood. Upon return of the chassis and axle to their normal position, the lever 32 will return to its normal position under the influence of the spring 39, and during this return movement, the pinion pawl 40 will be free to rotate in a counter-clockwise direction without shifting of the friction plates. Upon relative separation of the chassis and axle from normal position, the same result as above described will be obtained except that in this instance the lever 33 will be depressed and the series of friction plates 27 rotated in a counter-clockwise direction. With the arrangement herein described, it is obvious that the relative relation of the two sets of friction plates will be constantly changed, thus presenting different wearing surfaces and avoiding the formation of grooves or concentric scoring in the contacting friction faces of the disks. The capacity of the shock absorber can be varied, as will be understood, merely by adjusting the tension on the bolt 29, and the relative approach or separation of the chassis and axle before the shock absorber is brought into play can be varied, as hereinbefore described.

I claim:

1. In a shock absorber for vehicles and the like, the combination with two sets of eccentrically disposed rotatable friction plates, of means located at one side of said plates for rotating one set of said plates in one direction upon relative approach of the two members of the vehicle to be cushioned, and independent means located on the opposite side of said plates for rotating the other set of said plates in the opposite direction upon relative separation of said members.

2. In a shock absorber for vehicles and the like, the combination with two sets of eccentrically disposed rotatable friction plates, of independent sets of pawl and ratchet mechanisms located on diametrically opposite sides of said sets of plates coacting with said sets of friction plates, and common means for independently actuating said pawl and ratchet mechanisms upon relative approach or separation of the two vehicle members between which the shock absorber is adapted to be interposed.

3. In a shock absorber adapted to cushion the relative movements of the chassis and axle of an automobile or other vehicle, the combination with a supporting bracket having two sets of eccentrically disposed rotatable friction plates carried thereby, said sets of plates being provided with peripheral teeth, of a pair of independently operable levers, pawl acting means carried by each of said levers and adapted to coöperate with the teeth of the corresponding set of friction plates, and a member adapted to be oscillated upon relative approach or separation of the chassis and axle, said member after a predetermined amount of movement being adapted to actuate either of said levers dependent upon the direction of oscillation of said member.

4. In combination with the chassis and axle of a vehicle, of a shock absorber, said shock absorber comprising a supporting casting having two sets of eccentrically disposed rotatable friction disks carried thereby, oppositely extended and independently operable levers mounted on said supporting casting, pawl and ratchet mechanism carried by each lever and corresponding set of friction disks, spring means for returning said levers to normal position after each actuation of the shock absorber, and an oscillatable housing for independently actuating said levers.

In witness that I claim the foregoing I have hereunto subscribed my name this 24th day of Dec. 1917.

JOHN F. O'CONNOR.